(12) United States Patent
Chu

(10) Patent No.: US 7,454,572 B2
(45) Date of Patent: Nov. 18, 2008

(54) STACK CACHING SYSTEMS AND METHODS WITH AN ACTIVE SWAPPING MECHANISM

(75) Inventor: Chih-Hsing Chu, Taipei (TW)

(73) Assignee: Mediatek Inc., Hsin-Chu (TW)

( * ) Notice: Subject to any disclaimer, the term of this patent is extended or adjusted under 35 U.S.C. 154(b) by 263 days.

(21) Appl. No.: 11/268,888

(22) Filed: Nov. 8, 2005

(65) Prior Publication Data
US 2007/0106845 A1 May 10, 2007

(51) Int. Cl.
*G06F 12/00* (2006.01)
(52) U.S. Cl. .................. 711/132; 711/154; 711/163
(58) Field of Classification Search .............. 711/132, 711/154, 163
See application file for complete search history.

(56) References Cited

U.S. PATENT DOCUMENTS

| 6,131,144 | A | 10/2000 | Koppala | |
| 6,532,531 | B1 * | 3/2003 | O'Connor et al. | 712/202 |
| 2003/0110357 | A1 * | 6/2003 | Nguyen et al. | 711/136 |
| 2004/0210454 | A1 | 10/2004 | Coughlin et al. | |

OTHER PUBLICATIONS

Jazelle Technology Flyer.
"PicoJava: A Direct Execution Engine for Java Bytecode" McGhan et al., Oct. 1998, pp. 22-30.

* cited by examiner

*Primary Examiner*—Reba I Elmore
(74) *Attorney, Agent, or Firm*—Thomas, Kayden, Horstemeyer & Risley

(57) ABSTRACT

The disclosure defined by the invention described a stack caching system with a swapping mechanism for reducing software resource. The stack caching system utilizes a swap memory with higher access speed to increase the performance of the stack caching system. The stack caching system moves at least one first stack block which is the most frequently accessed stack block by the system from a first memory to the swap memory. Then, the stack caching system controls a pointer originally pointing to the first stack block to point to a corresponding address in the second memory. When the stack caching system accesses the first stack block, the stack caching system is directed to the second memory to access the first stack block.

12 Claims, 7 Drawing Sheets

STACK CACHING SYSTEMS AND METHODS WITH AN ACTIVE SWAPPING MECHANISM

BACKGROUND

The present disclosure relates generally to stack management, and more particularly to stack caching systems and methods with an active swapping mechanism.

In computer science, a stack machine is a computation model in which the memory takes the form of a stack. A stack machine also refers to an actual computer implementing or simulating the idealized stack machine. If a thread is switched to or a method is called, a corresponding stack is provided. Instructions store and retrieve an item on a stack based on the push-pop rule. An item is pushed onto the top of the stack, and an item popped off therefrom, moving the rest of the items in the stack up one level.

The efficiency of stack accessing is critical for a stack machine. For example, a Java virtual machine is a stack based machine. A Java stack comprises stack data, local variables, and virtual machine internal data. Since the memory space required for stacks is large, stacks are always stored in the normal memory with lower access speed. All computations of the Java virtual machine, however, are on the stacks. Therefore, storing stacks normal memory with lower access speed seriously reducing the processing efficiency of the Java virtual machine.

Several conventional mechanisms are provided to speed up the stack access. Harlan McGhan, Mike O'Connor have introduced a direct execution engine for Java bytecode (Java machine instructions), called PicoJava. PicoJava equips a circular buffer as stack cache, in which the bottom of the stack cache is adjacent to the top of the stack cache. New entries can be pushed on the top of a stack, growing the stack, and current entries can be popped off therefrom, shrinking the stack. If stack continues to grow and the number of entries pushed onto the stack cache exceeds the value of a high-water mark, a spill mechanism is performed, in which the oldest entry is scrubbed out to other stack memory. If entries are popped off the top of the stack and the number of entries in the stack cache falls below a low-water mark, a fill mechanism is performed, in which entries are copied from the stack memory to the stack cache. ARM Jazelle technology has introduced an architecture additionally equipped with up to four stack elements maintained in registers to reduce memory access to a minimum, in which stack spill and underflow is handled automatically by the hardware. In PicoJava and Jazelle technology, additional hardware must be provided.

Additionally, a conventional software solution has been provided to improve the processing efficiency of a stack machine, in which a JIT (just-in-time) or AOT (ahead-of-time) compiler transforms complex stack operations into simple register operations within CPU by translating bytecodes into machine code. The JIT or AOT compiler, however, compiles Java programs to generate machine code, increasing memory use.

SUMMARY

Stack caching systems and methods are provided.

An embodiment of a stack caching system with a swapping mechanism for reducing software resource is disclosed. The stack caching system profiles a first memory and identifies a first stack block which is the most frequently accessed stack block by the system in the first memory based on the profiling result. After the first stack block is identified, the first stack block is moved to a second memory which has higher access speed than the first memory and a pointer originally pointing to the first stack block points to a corresponding address in the second memory.

Another embodiment of a stack caching method for a stack caching system comprising a first memory and a second memory with high access speed is disclosed. The method comprises profiling the first memory; identifying a first stack block from a plurality of stack blocks stored in the first memory, wherein the first stack block is the most frequently accessed stack block by the system in the first memory; suspending the access operation of the first stack block; moving the first stack block from the first memory to the second memory; when the stack caching system accesses the first stack block, the stack caching system is directed to the second memory to access the first stack block.

Another embodiment of a stack caching method for a stack caching system comprising a first memory and a second memory with high access is disclosed. The method comprises profiling the first memory; identifying a first stack block from a plurality of stack blocks stored in the first memory, wherein the first stack block is the most frequently accessed stack block by the system in the first memory: moving the first stack block from the first memory to the memory; adjusting the pointer originally points to the first stack block to a corresponding address in the second memory; when the stack caching system accesses the first stack block, the stack caching system is directed to the second memory to access the first block based on the pointer.

Stack caching systems and methods may take the form of program code embodied in a tangible media. When the program code is loaded into and executed by a machine, the machine becomes an apparatus for practicing the disclosed method.

DESCRIPTION OF THE DRAWINGS

The invention will become more fully understood by referring to the following detailed description with reference to the accompanying drawings, wherein.

DESCRIPTION

Stack caching systems and methods are provided.

Figure 1:
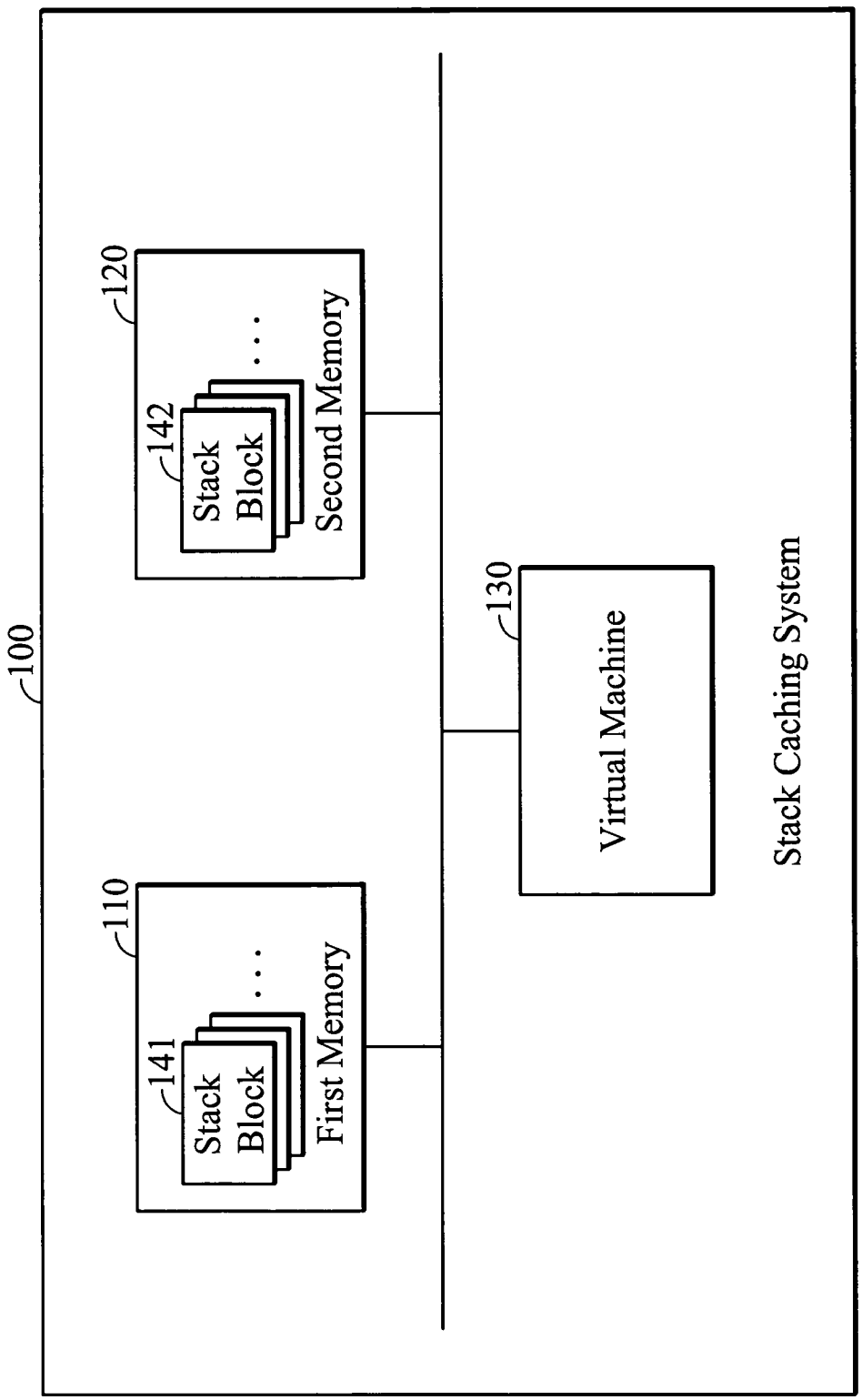
FIG. 1 is a schematic diagram illustrating an embodiment of a stack caching system.

FIG. 1 is a schematic diagram illustrating an embodiment of a stack caching system. The stack caching system 100 may be a data processing system comprising a first memory 110, a second memory 120, and a processor (not shown) that runs a virtual machine 130, such as Java virtual machine. In some embodiments, the data processing system may be an embedded system, such as a mobile station. The first memory 110 and second memory 120 respectively store a plurality of stack blocks (141 and 142). In this embodiment, the first memory is an external memory and the second memory is an internal memory. That is, the access of the second memory 120 is faster than that of the first memory 110. However, the capacity of the second memory 120 is limited and only a predetermined number of stack blocks can be stored therein, with the rest stored in the first memory 110. In the present invention, if there are frequently accessed stack blocks stored in the first memory 110, the stack caching system 100 will first identify those frequently accessed stack blocks and then move them to the second memory 120. Therefore, the frequently accessed stack blocks can be efficiently accessed. In this embodiment, to identify those frequently accessed stack blocks, the virtual machine 130 profiles all stack blocks in the first memory 110.

Figure 2:
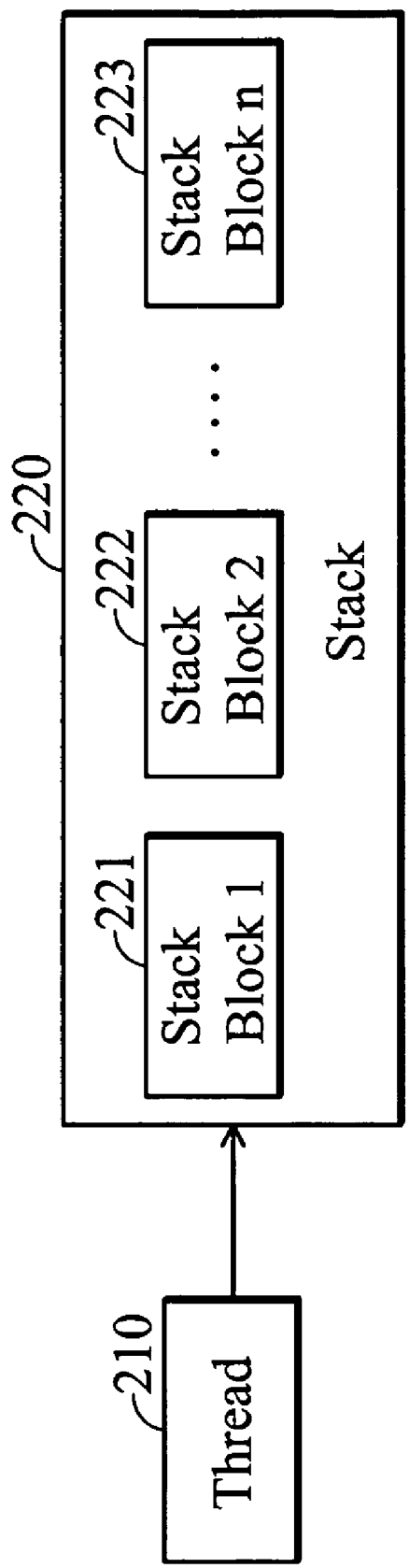
FIG. 2 is a schematic diagram illustrating the relationship between a thread and stack blocks.

The stack caching system 100 can handle at least one thread accessing stack blocks. In this embodiment, the virtual machine 130 of the stack caching system 100 can simultaneously handle multiple threads (contexts). FIG. 2 is a schematic diagram illustrating the relationship between a thread and stack blocks. As shown in FIG. 2, each thread 210 can access its own stack 220 comprising a plurality of stack blocks (221, 222, and 223). It is understood that, in some embodiments, a stack may only include one stack block, and that the virtual machine 130 comprises a scheduler, an ISR (Interrupt Service Routines) dispatcher, and at least one ISR (not shown), scheduling context switch procedure and rescheduling contexts comprising threads, dispatching to specific ISRs, and serving specific interrupts, respectively. Profiling stack blocks comprises analyzing performance, computing resource utilization, or execution on specific stack blocks. In some embodiment, to profile the stack blocks, an additional field (not shown) can be added to respective stack blocks. While performing the context switch procedure, rescheduling dispatching to specific ISRs, or serving specific interrupts, additional information of contexts, such as accumulated access time and/or access frequency can be recorded to the additional field of the accessed stack block.

Since the additional information must be recorded for profiling analysis, in some embodiments, the processes of the scheduler, ISR, and ISR are modified. After the scheduler locates a context to be switched to, a time and an identification of the context are recorded. After the ISR dispatcher locates an interrupt source, a time and an identification of the interrupt source are recorded before branching to an ISR and/or after branching to the ISR. Before servicing an interrupt and/or after servicing the interrupt, the ISR records a time and an identification of the interrupt. The recorded time and the identification are used for context profiling. It is understood that the modifications on the scheduler, ISR, and ISR are not limited thereto, and the manner of recording additional information is not limited thereto. Generally, the processor always spends most execution time on some threads, and on some specific stack blocks of the thread. The virtual machine 130 can use the profiling results to move stack blocks between the first memory 110 and the second memory 120.

Figure 3:
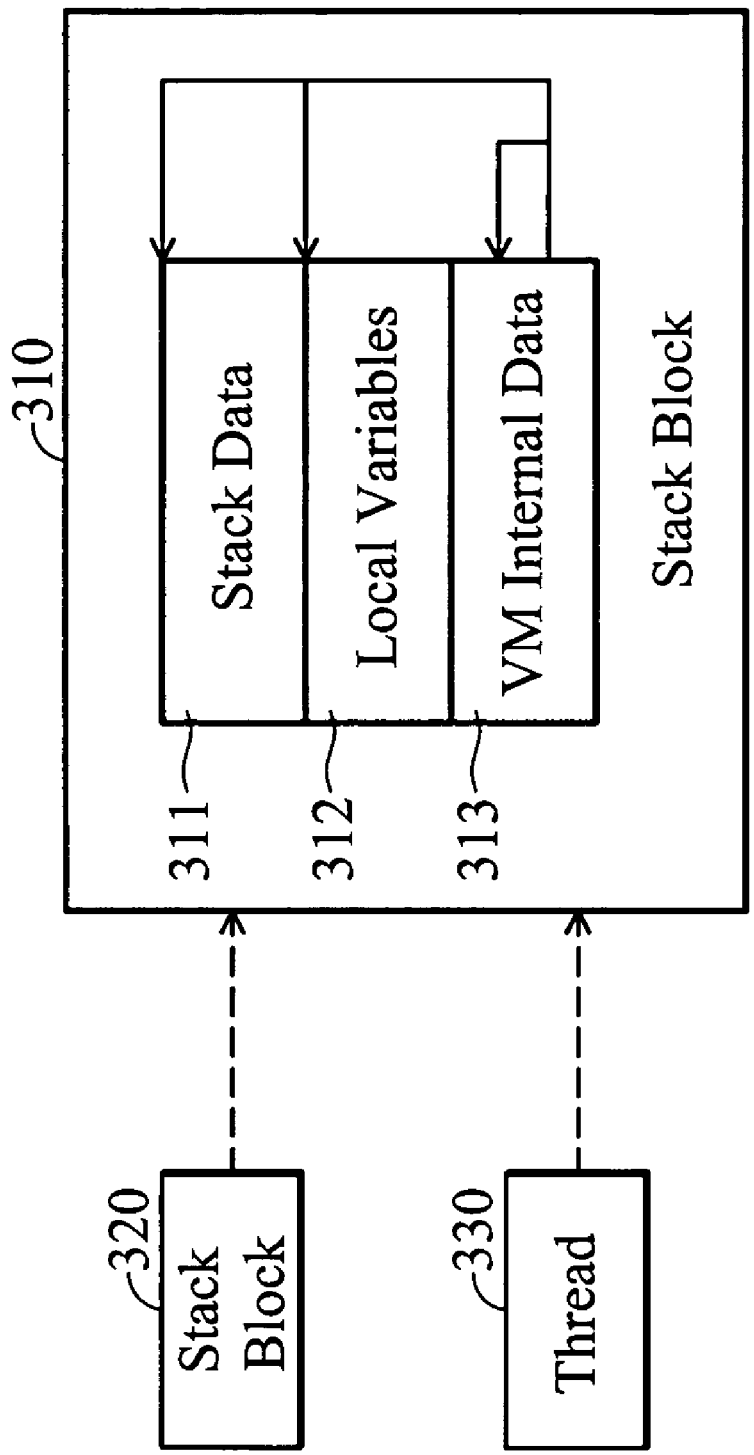
FIG. 3 is a schematic diagram illustrating an embodiment of a stack block.

FIG. 3 is a schematic diagram illustrating an embodiment of a stack block. As shown in FIG. 3, the stack block 310 comprises stack data 311, local variables 312, and virtual machine (VM) internal data 313. The stack data 311 is data required when a program is executed. The local variables 312 includes references for objects such as Java objects and any types of digits. The VM internal data 313 may have pointers pointing to the stack data 311, local variables 312, and VM internal data 313 itself. Additionally, another stack block 320 and/or a thread 330 may have pointers pointing to the stack block 310. Once the stack block is moved, the address that the pointers pointing to must be adjusted. In some embodiment, the pointers may be adjusted by adding an offset to the original address.

Figure 4:
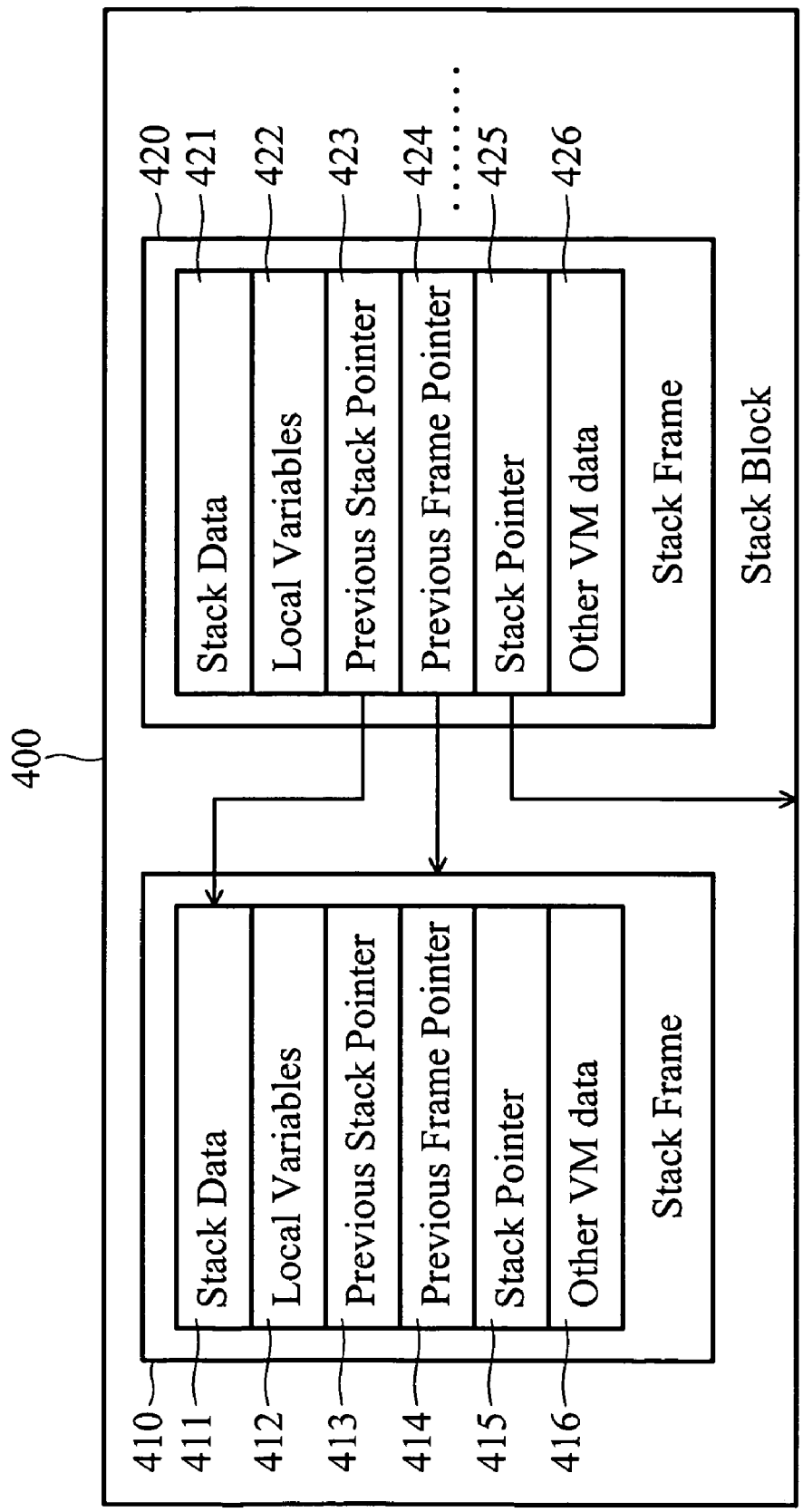
FIG. 4 is a schematic diagram illustrating an embodiment of a stack block.

FIG. 4 is a schematic diagram illustrating an embodiment of a stack block. In this embodiment, a stack block 400 comprises a plurality of stack frames (410 and 420). Stack frame 420 comprises stack data 421, local variables 422, a previous stack pointer 423, a previous frame pointer 424, a stack pointer 425, and other VM data 426, in which the previous stack pointer 423, previous frame pointer 424, stack pointer 425, and VM data 426 are included in the VM internal data mentioned above. The previous stack pointer 423 points to the stack data 411 of a previous stack frame 410. The previous frame pointer 424 points to the previous stack frame 410. The stack pointer 425 points to the stack block 400 comprising the stack frame 420. Similarly, once the stack block is moved, the pointers must be adjusted.

It should be noted that the stack block structure and pointers described in FIG. 3 and FIG. 4 are merely examples of possible stack blocks and pointers need to be adjusted, rather a limitation to the present invention. Persons skilled in the art should understand that the claimed stack caching method can be implemented in all kinds of stack block structures.

Figure 5:
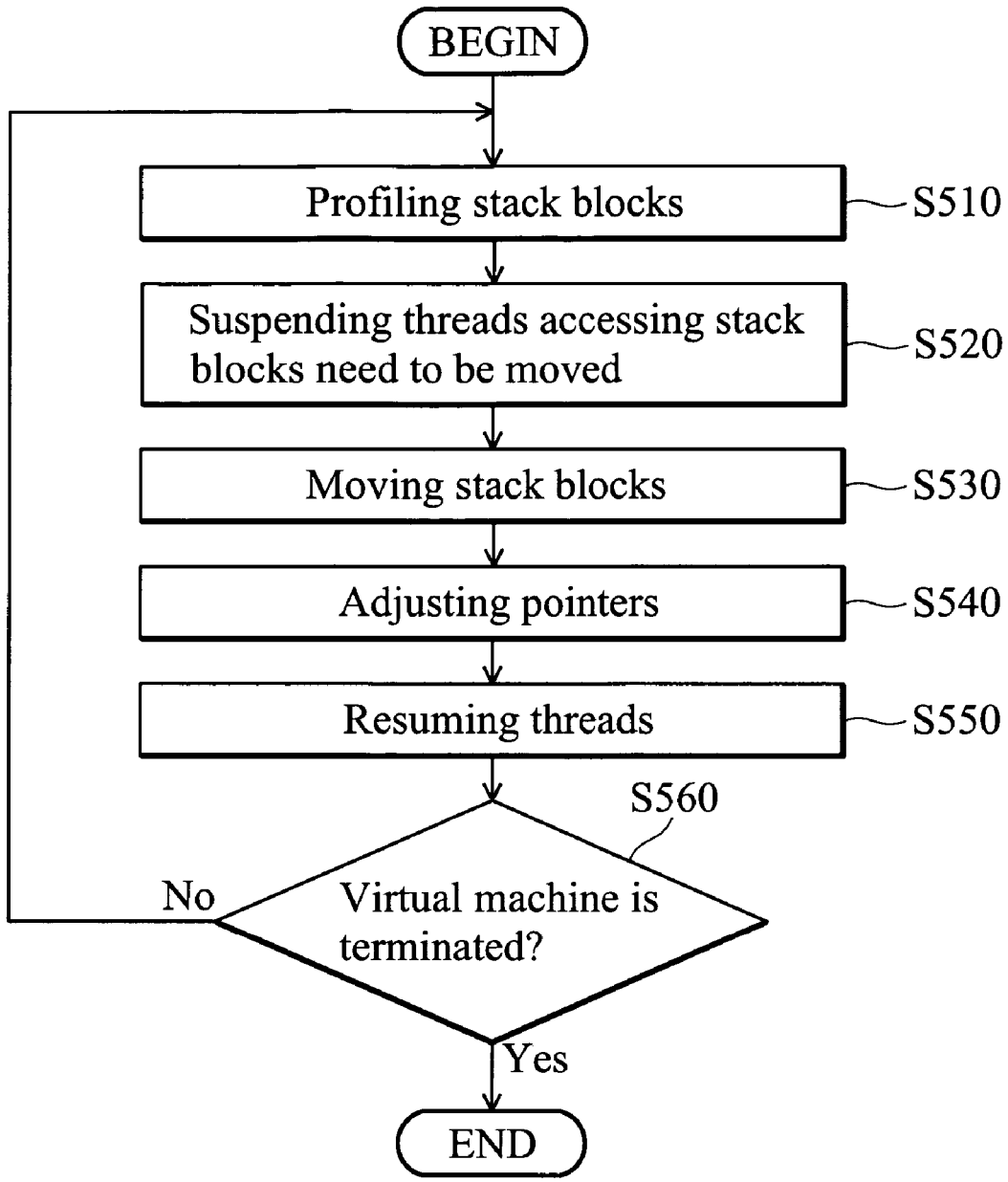
FIG. 5 is a flowchart of an embodiment of a stack caching method.
Figure 6:
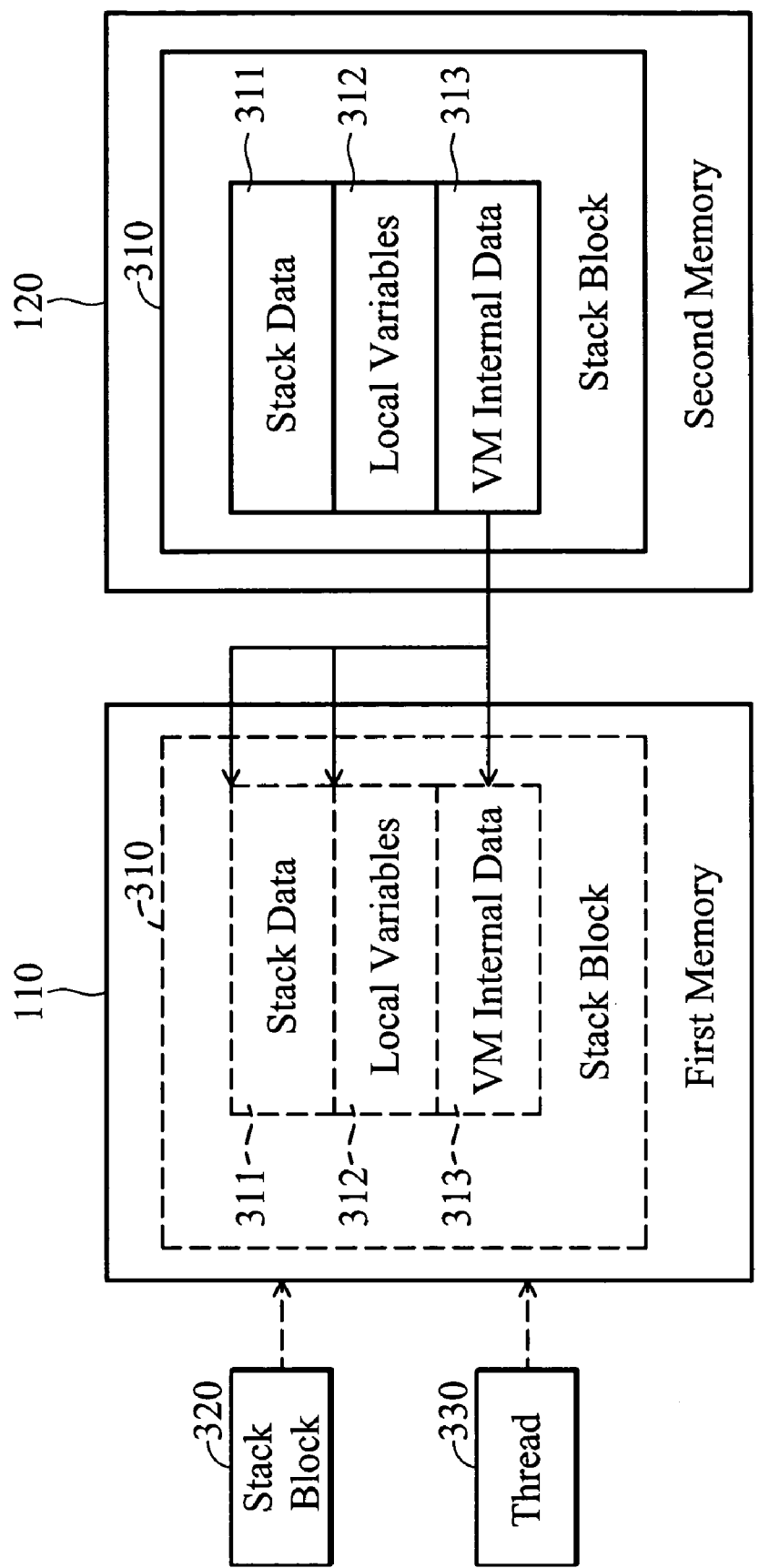
FIG. 6 is a schematic diagram illustrating an embodiment of a stack block after moving, but without pointer adjustment.
Figure 7:
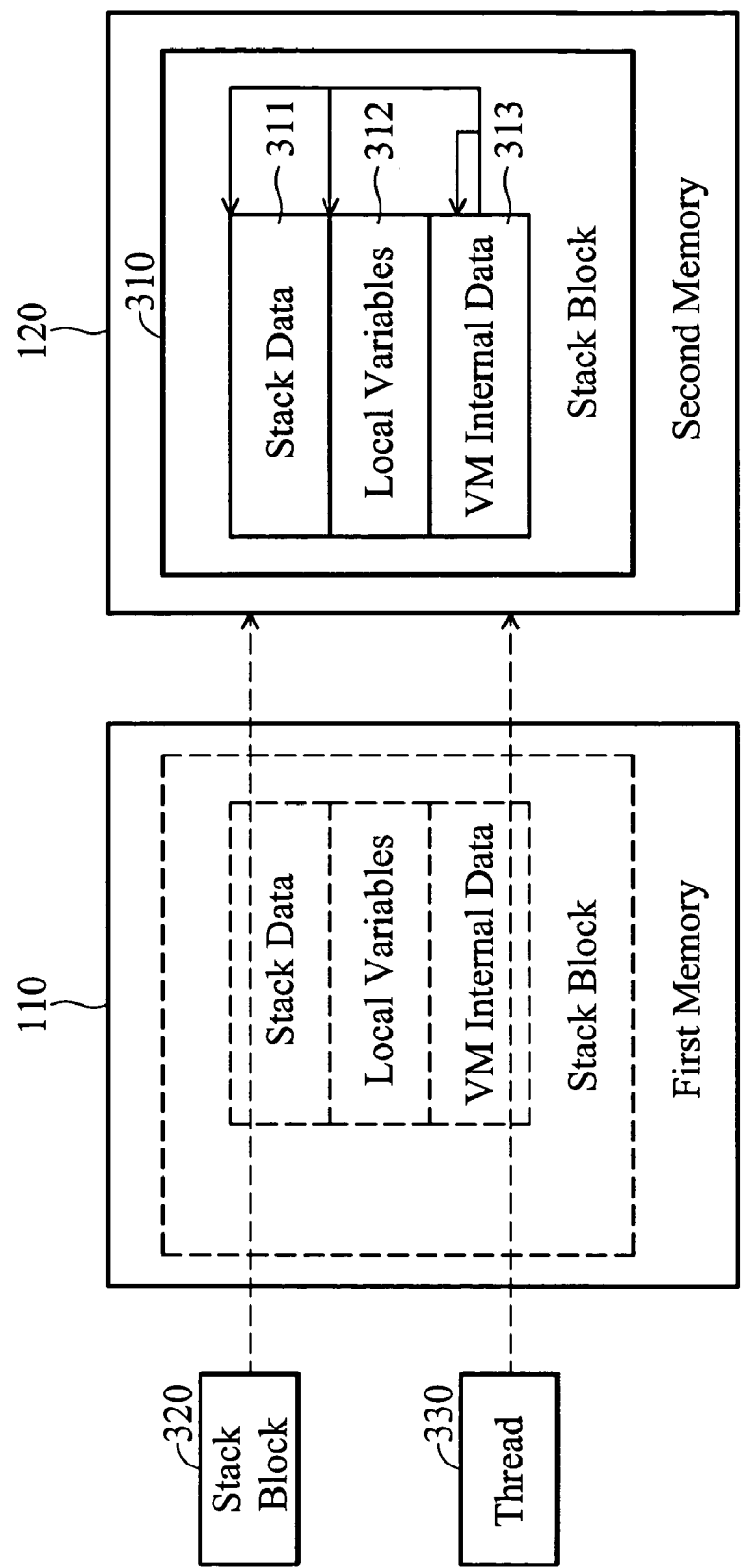
FIG. 7 is a schematic diagram illustrating an embodiment of a stack block after moving with pointer adjustment.

FIG. 5 is a flowchart of an embodiment of a stack caching method. In step S510, the stack blocks in the system are profiled to determine which stack blocks are frequently accessed. As described, the profiling of stack blocks is based on recorded additional information, such as accumulated access time and access frequency. It is understood that the number of stack blocks to be moved to the second memory 120 is determined according to the available memory space of the second memory 120 and the profiling results. In step S520, threads currently accessing the selected stack blocks are suspended. In step S530, stack blocks are moved. The moving of stack blocks comprises moving stack blocks from the first memory 110 to the second memory 120 and swapping stack blocks between the first memory 110 and the second memory 120. For example, if space for a specific number of stack blocks is available in the second memory 120, the top specific number of stack blocks accessed frequently and currently not in the second memory 120 are moved to the second memory 120. If no more memory space is available in the second memory 120 and the access frequency of a first stack block in the first memory 110 is greater than that of a second stack block in the second memory 120, the first and second stack blocks are swapped. FIG. 6 is a schematic diagram illustrating an embodiment of a stack block after moving, but without pointer adjustment. As shown in FIG. 6, the stack block 310 originally in the first memory 110 is moved to the second memory 120. After the stack block 310 is moved, pointers in the VM internal data 313 of the stack block moved to the second memory 120 however still point to the original addresses of the stack data 311, local variables 312, and VM internal data 313 in the first memory 110. Additionally, pointers in the stack block 320 and the thread 330 also still point to the original address of the stack block 310 in the first memory 110. In step S540, the pointers of the moved stack blocks and the stack block and thread pointing to the moved stack blocks are adjusted. FIG. 7 is a schematic diagram illustrating an embodiment of a stack block after moving with pointer adjustment. After the pointers are adjusted, the pointers in the VM internal data 313 of the stack block moved to the second memory 120 are adjusted to point to the new addresses of the stack data 311, local variables 312, and VM internal data 313 in the second memory 120. Additionally, pointers in the stack block 320 and the thread 330 are adjusted to point to the new address of the stack block 310 in the second memory 120. In step S550, the suspended threads are resumed activity, such that the threads can correctly point to and access the stack blocks. In step S560, it is determined whether the virtual machine 130 is terminated. If not, the procedure returns to step S510. If so, the procedure is completed.

Stack caching systems and methods, or certain aspects or portions thereof, may take the form of program code (i.e., executable instructions) embodied in tangible media, such as products, floppy diskettes, CD-ROMS, hard drives, or any other machine-readable storage medium, wherein, when the program code is loaded into and executed by a machine, such as a computer, the machine thereby becomes an apparatus for practicing the methods. The methods may also be embodied in the form of program code transmitted over some transmission medium, such as electrical wiring or cabling, through fiber optics, or via any other form of transmission, wherein, when the program code is received and loaded into and executed by a machine, such as a computer, the machine becomes an apparatus for practicing the disclosed methods. When implemented on a general-purpose processor, the program code combines with the processor to provide a unique apparatus that operates analogously to application specific logic circuits.

While the invention has been described by way of example and in terms of preferred embodiment, it is to be understood that the invention is not limited thereto. Those skilled in this technology can still make various alterations and modifications without departing from the scope and spirit of this invention. Therefore, the scope of the present invention shall be defined and protected by the following claims and their equivalents.

What is claimed is:

1. A stack caching method for use in a system comprising a first memory and a second memory, the method comprising:
   profiling the first memory to acquire access frequencies of corresponding stack blocks of the first memory;
   identifying a first stack block from a plurality of stack blocks stored in the first memory based on the profiling result, wherein the first stack block is the most frequently accessed stack block by the system in the first memory;
   suspending the access operation of the first stack block; and
   moving the first stack block from the first memory to the second memory with higher access speed;
   wherein after the movement, the first stack block is accessible in the second memory by the system.

2. The stack caching method of claim 1, wherein the moving step further comprising:
   locating at least one pointer originally pointing to an original address of the first stack block in the first memory; and
   adjusting the pointer to point to a new address in the second memory.

3. The stack caching method of claim 2, wherein the adjusting step further comprising:
   adding an offset to the original address of a second pointer related to the first stack block.

4. The stack caching method of claim 1, wherein the first memory is an external memory and the second memory is an internal memory.

5. A stack caching method for use in a system comprising a first memory and a second memory, the method comprising:
   profiling the first memory to acquire access frequencies of corresponding stack blocks of the first memory;
   identifying a first stack block from a plurality of stack blocks stored in the first memory based on the profiling result, wherein the first stack block includes data containing at least one pointer;
   moving the first stack block from the first memory to the second memory with higher access speed; and
   adjusting the pointer originally points to the first stack block to a new address in the second memory.

6. The method of claim 5, wherein the system contains at least one thread accessing the stack blocks, each stack block records a time period being accessed by the thread, wherein the identifying step further comprising:
   comparing the recorded time period of each stack block in the first memory, wherein the first stack block is the one having the longest recorded time period.

7. The method of claim 5, wherein the first stack block further comprises stack data, local variables, or virtual machine internal data.

8. The method of claim 7, wherein the pointer points to the first stack block, or the stack data of the first stack block, the local variables of the first stack block, the virtual machine internal data of the first stack block, or other stack blocks.

9. The method of claim 6, further comprising:
   suspending at least one thread from accessing the first stack block before the first stack block is moved to the second memory.

10. The method of claim 9, further comprising:
    resuming the thread after the pointer is adjusted.

11. The method of claim 6, wherein the thread comprises a garbage collector or a Java thread.

12. The method of claim 5, wherein the access in the second memory is faster than that of the first memory.

* * * * *